(12) United States Patent
Matsubayashi

(10) Patent No.: US 10,715,780 B2
(45) Date of Patent: Jul. 14, 2020

(54) DISPLAY CONTROLLING APPARATUS, DISPLAY CONTROLLING METHOD, AND STORAGE MEDIUM

(71) Applicant: CANON KABUSHIKI KAISHA, Tokyo (JP)

(72) Inventor: Kazuhiro Matsubayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/195,027

(22) Filed: Nov. 19, 2018

(65) Prior Publication Data

US 2019/0158801 A1    May 23, 2019

(30) Foreign Application Priority Data

Nov. 21, 2017 (JP) ................................ 2017-223686

(51) Int. Cl.
*H04N 13/111* (2018.01)
*G06T 1/00* (2006.01)

(52) U.S. Cl.
CPC .............. *H04N 13/111* (2018.05); *G06T 1/00* (2013.01)

(58) Field of Classification Search
CPC ............. H04N 13/111; H04N 13/0014; H04N 13/0278; H04N 13/117; H04N 13/279; G06T 1/00
See application file for complete search history.

(56) References Cited

U.S. PATENT DOCUMENTS

| 10,419,788 B2* | 9/2019 | Arimilli | H04N 21/23439 |
| 2008/0174594 A1* | 7/2008 | Li | H04N 13/111 345/418 |
| 2010/0026712 A1* | 2/2010 | Aliprandi | H04N 13/111 345/629 |
| 2010/0060793 A1* | 3/2010 | Oz | H04N 5/272 348/584 |
| 2011/0275415 A1* | 11/2011 | Lee | G06F 1/1686 455/566 |
| 2012/0141016 A1* | 6/2012 | Wildeboer | H04N 13/271 382/154 |
| 2012/0188452 A1* | 7/2012 | Keiser | G06T 13/00 348/559 |
| 2012/0299920 A1* | 11/2012 | Coombe | G06T 19/00 345/423 |

(Continued)

FOREIGN PATENT DOCUMENTS

JP    2014-164685 A    9/2014

*Primary Examiner* — Fernando Alocn
(74) *Attorney, Agent, or Firm* — Venable LLP

(57) ABSTRACT

There is provided a display controlling apparatus which comprises: an obtaining unit configured to obtain virtual camera path information related to a movement path of a virtual viewpoint related to a virtual viewpoint video image generated based on a plurality of shot images obtained by shooting a shooting target area with a plurality of cameras; a generating unit configured to generate a virtual camera path image representing the plurality of movement paths including first and second movement paths of the virtual viewpoint, based on the virtual camera path information obtained by the obtaining unit; and a display controlling unit configured to display the virtual camera path image generated by the generating unit, on a display screen.

23 Claims, 12 Drawing Sheets

(56) References Cited

U.S. PATENT DOCUMENTS

| | | | |
|---|---|---|---|
| 2014/0059418 A1* | 2/2014 | Yu | G06F 40/169 |
| | | | 715/230 |
| 2014/0376635 A1* | 12/2014 | Senoh | H04N 13/194 |
| | | | 375/240.16 |
| 2015/0130799 A1* | 5/2015 | Holzer | G06F 16/532 |
| | | | 345/420 |
| 2016/0150208 A1* | 5/2016 | Li | H04N 13/111 |
| | | | 382/154 |
| 2016/0191893 A1* | 6/2016 | Gewickey | G11B 27/036 |
| | | | 386/223 |
| 2017/0064280 A1* | 3/2017 | Cho | G06K 9/4604 |
| 2017/0302901 A1* | 10/2017 | Yang | H04N 13/00 |
| 2019/0281274 A1* | 9/2019 | Sugio | H04N 13/161 |

\* cited by examiner

DISPLAY CONTROLLING APPARATUS, DISPLAY CONTROLLING METHOD, AND STORAGE MEDIUM

BACKGROUND OF THE INVENTION

Field of the Invention

The present invention relates to a technique of displaying, on a two-dimensional plane, trajectory data (camera path) of a virtual camera in a three-dimensional space.

Description of the Related Art

In computer graphics (CG), a three-dimensional object modeled in three-dimensional space is rendered as a two-dimensional video image viewed from an arbitrary viewpoint. A camera virtually disposed in the three-dimensional space to express position and visual field range (angle of view) of an arbitrary viewpoint is called a virtual camera. An operator of the virtual camera manipulates the position and visual field range of the virtual camera in the three-dimensional space according to progress of a scene. Trajectories (or loci) of the position and visual field range of the virtual camera in the three-dimensional space are generally called virtual camera paths (or simply camera paths). Besides, a two-dimensional moving image generated based on the camera path is called a free viewpoint video image. If there are three-dimensional object data of a scene and camera path data, it is possible to reproduce the trajectories of the position and visual field range of the virtual camera to play back the free viewpoint video image.

In recent years, a technique of generating a three-dimensional object from video images shot by a large number of cameras (actual cameras instead of virtual cameras) and playing back a free viewpoint video image has been developed, and an expectation for using the played-back free viewpoint video image for various needs has increased. In particular, in sports broadcasting, there are great needs for replaying one scene from various viewpoints (even from a viewpoint where there is no actual camera), so that a large number of camera paths are often created from one scene. For example, in live broadcast of sports, a large number of camera paths respectively viewed from different viewpoints are generated in a score scene and a fine play scene, and free viewpoint video images are replayed one after another. Moreover, the score scene and the fine play scene are replayed many times during the game and after the game, so that there is a case where the camera path is reused.

Here, since time is limited in the live broadcasting, it is required to quickly and surely find a desired camera path from among a large number of created camera paths and to play back the video image using the found desired camera path. On the other hand, in a highlight program to be broadcasted at a later date, there is a possibility that more camera paths are created from one play and various free viewpoint video images are played back. Also, in the highlight program, since there is time from a game to broadcasting, more camera paths are created by trial and error in addition to the camera paths actually used for the broadcasting in order to pursue better camera paths. That is, in the highlight program, since a great number of camera paths are created, it is required to quickly find the camera path to be reedited and/or the camera path for the free viewpoint video image playback from among the created camera paths. Regarding such a point, Japanese Patent Application Laid-Open No. 2014-164685 discloses that free viewpoint video images respectively played back from a plurality of camera paths are simultaneously displayed on a plurality of screens.

According to Japanese Patent Application Laid-Open No. 2014-164685, a user (operator) looks at the free viewpoint video image to be played back and decides whether or not a desired camera path has been used. However, in a case there are a plurality of similar camera paths, it often takes much time until a scene by which the user can decide whether or not the desired camera path has been used in the free viewpoint video image appears. Besides, in a case where the user looks at a large number of free viewpoint video images at the same time, there is a fear that the user misses a scene by which he/she can decide whether or not the desired camera path has been used. In this case, if the user misses the relevant scene, he/she has to perform the playback again. Besides, in a case where there are a large number of camera paths and it is impossible to display the free viewpoint video images at once, it is necessary to play back the free viewpoint video images in plural times. In this case, it takes time and it is difficult to perform comparison of these video images. That is, in the related background art, it is difficult to quickly find a desired camera path from among a large number of camera paths.

SUMMARY OF THE INVENTION

The present invention has been completed in consideration of such a problem as described above, and an object thereof is to provide a display controlling apparatus which is characterized by comprising: an obtaining unit configured to obtain virtual camera path information related to a movement path of a virtual viewpoint related to a virtual viewpoint video image generated based on a plurality of shot images obtained by shooting a shooting target area with a plurality of cameras; a generating unit configured to generate a virtual camera path image representing the plurality of movement paths including first and second movement paths of the virtual viewpoint, based on the virtual camera path information obtained by the obtaining unit; and a display controlling unit configured to display the virtual camera path image generated by the generating unit, on a display screen.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Incidentally, it is to be noted that the embodiments described below show an example in a case where the present invention is concretely practiced, and the present invention is not limited to the following embodiments.

In the present embodiment, there will be described an example in which an information processing apparatus of the present invention is applied to a camera path displaying system in which trajectories of positions and visual field ranges (angles of view) of a plurality of cameras in a three-dimensional space are displayed as camera paths on a two-dimensional plane.

First Embodiment

Figure 1:
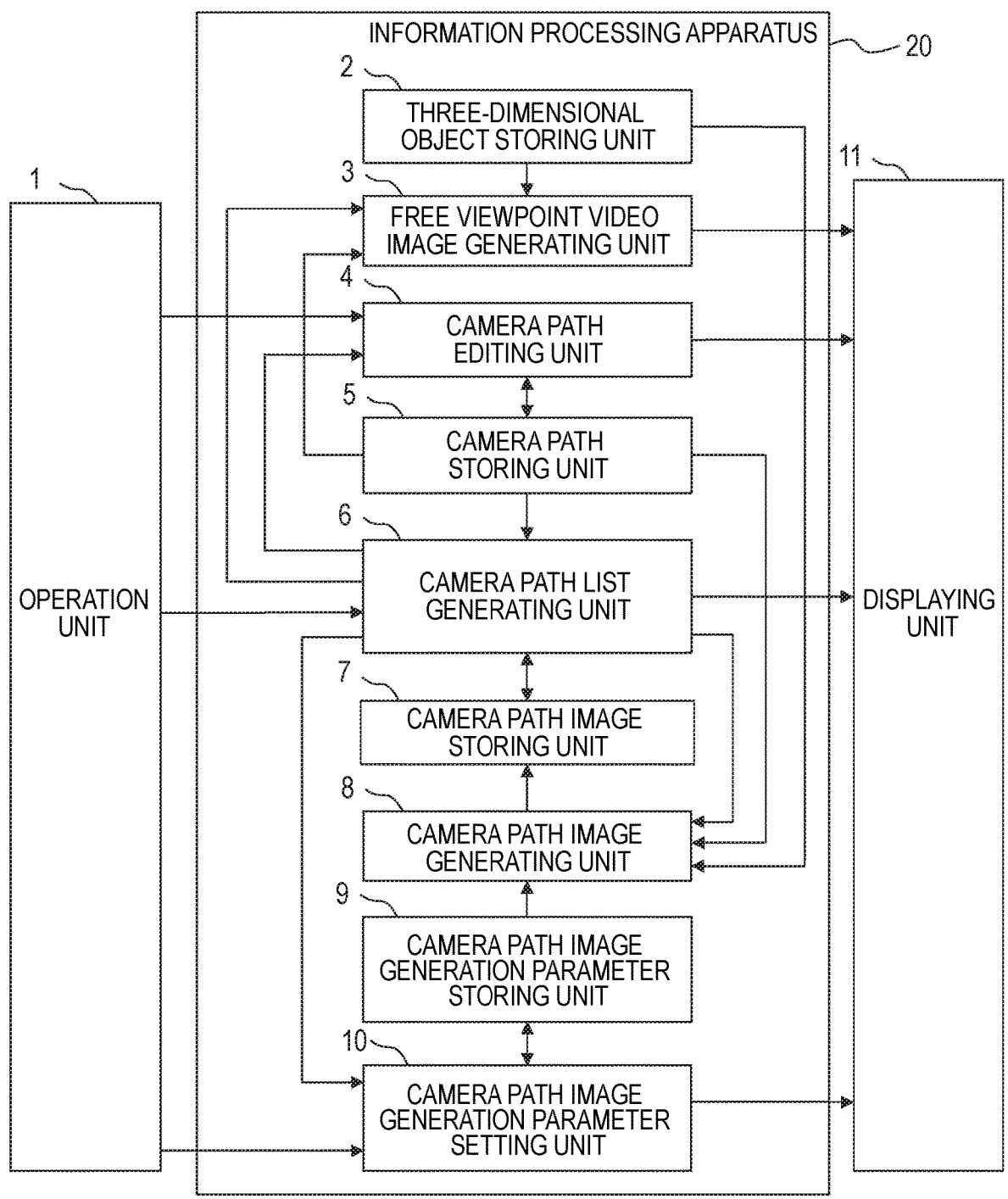
FIG. 1 is a block diagram of a camera path displaying system according to an embodiment of the present invention.

FIG. 1 is a block diagram of a camera path displaying system including an information processing apparatus 20 according to the first embodiment. The camera path displaying system is configured by comprising an operation unit 1, the information processing apparatus 20, and a displaying unit 11.

The information processing apparatus 20 is, for example, a personal computer (main body of PC (personal computer)). The operation unit 1 corresponds to a keyboard, a mouse or a dedicated controller of the personal computer or the like, acquires an operation input from a user, and transfers the acquired input to the information processing apparatus 20. The displaying unit 11 is, for example, a displaying device such as a liquid crystal display, receives display data from the information processing apparatus 20, and displays an image or the like on a screen.

The information processing apparatus 20 according to the present embodiment has a constitution made by components from a three-dimensional object storing unit 2 to a camera path image generation parameter setting unit 10.

The three-dimensional object storing unit 2 stores data (modeling data, texture data, layout data) related to three-dimensional objects arranged on a three-dimensional plane in association with the passage of time.

A free viewpoint video image generating unit 3 generates a free viewpoint video image based on data related to the three-dimensional object stored in the three-dimensional object storing unit 2 and camera path data corresponding to the trajectories of the position and visual field range (angle of view) of a virtual camera, and outputs the generated video image as two-dimensional moving image data.

A camera path editing unit 4 edits the camera path data based on the operation input from the user via the operation unit 1. More specifically, the camera path editing unit 4 edits the camera path data by performing setting and adjustment for the position and visual field of the virtual camera based on the operation input from the operation unit 1, with respect to each of frames from the start time to the end time of a moving image scene. Besides, the camera path editing unit 4 has a function of, in a case where the positions and visual fields of the virtual cameras are set and adjusted with respect to several specific frames based on the operation input of the operation unit 1, obtaining the positions and visual fields of virtual cameras in frames on the way in these specific frames by interpolation.

A camera path storing unit 5 stores the camera path data edited by the camera path editing unit 4, in association with the passage of time of three-dimensional object data.

A camera path image generating unit 8 generates a camera path image based on the above-described camera path data and three-dimensional object data and a later-described camera path image generation parameter. Details of the camera path image will be described later.

A camera path image storing unit 7 stores the camera path image generated by the camera path image generating unit 8. The camera path image is stored in the camera path image storing unit 7 in association with a camera path and the camera path image generation parameter used for generating the camera path image.

The camera path image generation parameter setting unit 10 sets the camera path image generation parameter based on the operation input from the user via the operation unit 1. The camera path image generation parameter includes parameters corresponding to a position and visual field looking down on the camera path, and display/non-display, color, shape, display interval and the like of an object to be drawn in the camera path image.

A camera path image generation parameter storing unit 9 stores the camera path image generation parameter set by the camera path image generation parameter setting unit 10.

Here, setting or changing of the parameters corresponding to the position and visual field looking down on the virtual camera is performed, for example, by operating with the user the position and visual field of a virtual looking-down camera looking down on the virtual camera from a predetermined point in the three-dimensional space via a controller or the like of the operation unit 1. In this case, when the operation of setting or changing the position and visual field of the virtual looking-down camera is performed from the user via the operation unit 1, the camera path image generation parameter setting unit 10 sets or changes the parameters of the position and visual field looking down on the virtual camera, based on the position and visual field of the virtual looking-down camera.

Besides, setting or changing of the parameters corresponding to the display/non-display, color, shape, display interval and the like of the object is performed by displaying a parameter operation screen for these parameters on the screen of the displaying unit 11 and causing the user to perform the operation input via the parameter operation screen. That is, when the operation input is performed from the user via the operation unit 1 to the parameter operation screen, the camera path image generation parameter setting unit 10 sets or changes the parameters corresponding to the display/non-display, color, shape, display interval and the like of each drawing object, based on the operation input.

A camera path list generating unit 6 list-displays the above-described camera path images within a window displayed on the screen of the displaying unit 11. The camera path list generating unit 6 also has a function of, together with each list-displayed camera path image, displaying file name, update date and time, metadata (keyword, evaluation score, etc.) and the like of the camera path of each the list-displayed camera path image, on the displaying unit 11.

Besides, when a selection operation of the camera path image and a selection operation of a processing menu (not illustrated) are performed via the operation unit 1, the camera path list generating unit 6 starts (activates) to perform the process related to the camera path corresponding to the selected camera path image. For example, in a case where the camera path images are being list-displayed on the displaying unit 11, when the user selects and operates one camera path image via the operation unit 1, the camera path list generating unit 6 displays menu items such as "edit camera path", "display free viewpoint video image" and the like on the displaying unit 11. Here, when the user selects one of the menu items via the operation unit 1, the camera path list generating unit 6 displays a screen corresponding to the selected menu item on the displaying unit 11. For example, when the menu item of "edit camera path" is selected, a camera path edit screen for the camera path is displayed on the displaying unit 11. Further, for example, when the menu item of "display free viewpoint video image" is selected, a free viewpoint video image display screen for the camera path is displayed on the displaying unit 11.

Besides, the camera path list generating unit 6 also has a function of displaying one or more folders including a camera path file on the displaying unit 11. Here, when one folder is selected and operated by the user via the operation unit 1, the camera path list generating unit 6 displays, on the displaying unit 11, a camera path image list in the selected folder.

Besides, the camera path list generating unit 6 also has a function of, in a case where a predetermined search condition of the camera path is input by a user's menu (not illustrated) operation via the operation unit 1, displaying a camera path image list of the camera path searched based on the predetermined search condition. For example, the search condition of the camera path includes file name, update date and time, metadata and the like of the camera path.

Besides, the camera path list generating unit 6 also has a function of, in a case where selection operations of the plurality of camera path images are performed by the user via the operation unit 1, displaying a list of only the selected camera path images. Thus, in a case where the user tries to find a desired camera path from among a large number of camera paths, it is possible to narrow down and display only similar camera paths, so that it becomes easy for the user to compare a difference between the respective camera paths narrowed down.

Besides, the camera path list generating unit 6 also has a function of adding common metadata to the list-displayed camera paths or the camera paths selected from among the list-displayed camera paths and storing these camera paths, by a menu (not illustrated) operation and/or a character input operation from the user. By adding the metadata to the camera paths in this manner, it is possible to narrow down the camera paths by classification or retrieval based on the metadata, so that it becomes possible for the user to find a desired camera path more efficiently.

The displaying unit 11 in the camera path displaying system of the present embodiment displays the free viewpoint video image, the camera path list display window, the position and visual field of the virtual looking-down camera, the operation screen such as the parameter operation screen or the like, the menu and the like as described above, on the screen.

Figure 2:
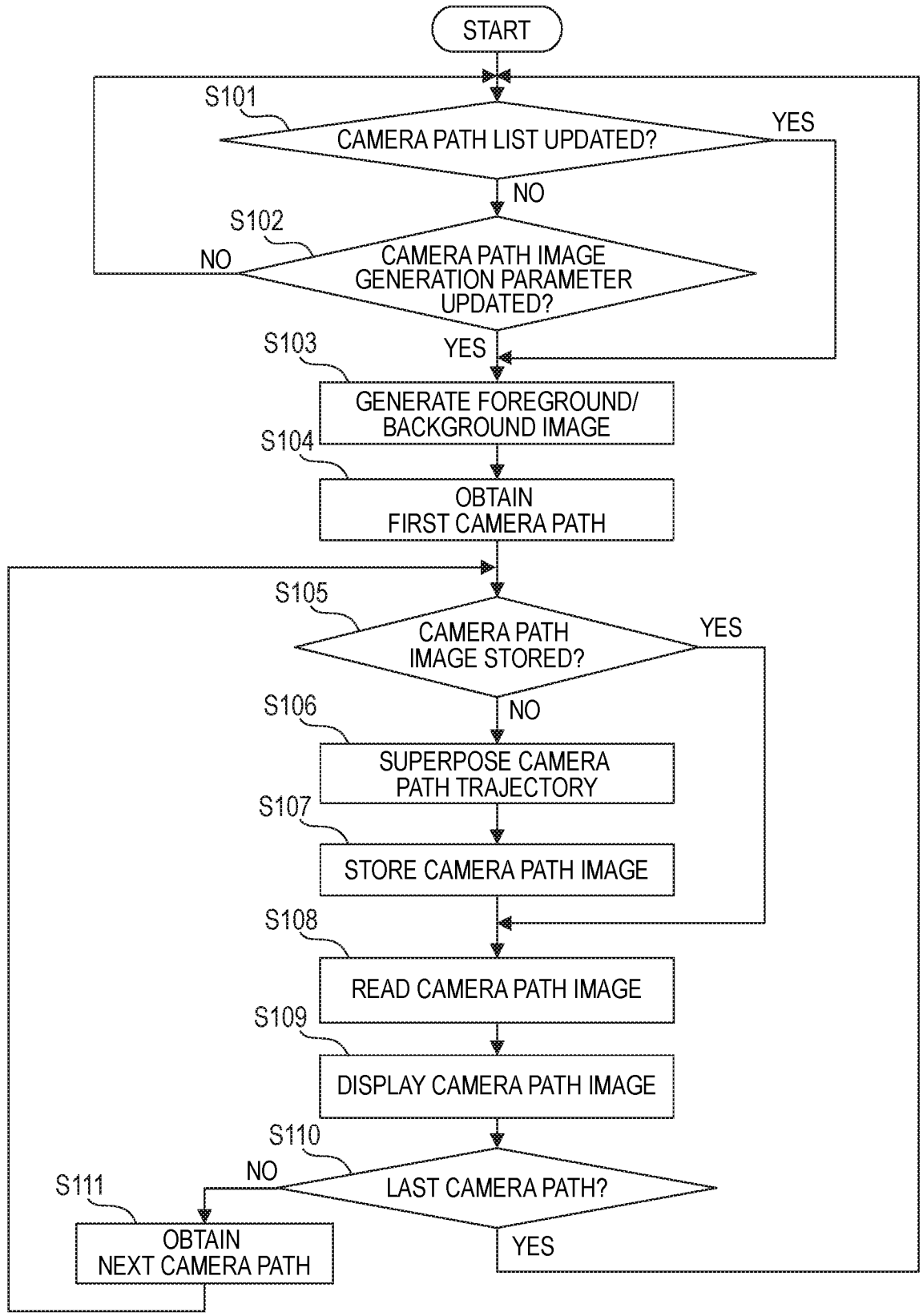
FIG. 2 is a flowchart of a camera path list displaying process according to a first embodiment.

FIG. 2 is a flowchart for describing a process of generating and displaying the above list of the camera path images in the information processing apparatus 20 of the first embodiment. In the following description, each of processing steps S101 to S111 in the flowchart of FIG. 2 will be abbreviated as S101 to S111 respectively. The process of the flowchart of FIG. 2 may be performed by a software configuration or a hardware configuration, or a part of the process may be performed by a software configuration and the rest may be realized by a hardware configuration. In the case where the process is performed by the software configuration, for example, a CPU (central processing unit) or the like executes the program related to the present embodiment stored in a ROM (read only memory) or the like, so that the process is realized. The program related to the present embodiment may be prepared in advance in the ROM or the like, may be read from a detachable semiconductor memory or the like, or may be downloaded from a network such as the Internet (not illustrated). These are assumed to be the same in other flowcharts to be described later.

In S101, the camera path list generating unit 6 determines whether or not the list of the camera paths to be list-displayed is updated. When it is determined that the list is updated, the camera path list generating unit 6 advances the process to S103. On the other hand, when it is determined that the list is not updated, the camera path list generating unit advances the process to S102. Here, for example, when a folder is opened, the camera path list generating unit 6 sets camera path files in the folder as targets of list display. Besides, in case of searching for the camera path by a predetermined search condition (file name, update date and time, metadata, etc.), the camera path list generating unit 6 sets the searched camera path files as targets of list display.

In S102, the camera path list generating unit 6 determines whether or not the camera path image generation parameter is updated. When it is determined that the camera path image generation parameter is updated, the camera path list generating unit 6 advances the process to S103. On the other hand, when it is determined that the camera path image generation parameter is not updated, the camera path list generating unit returns the process to S101.

In S103, the camera path list generating unit 6 causes the camera path image generating unit 8 to generate a foreground/background image which is the source of the camera path image. The camera path image generating unit 8 in S103 generates, as the foreground/background image, an image which is obtained by looking down on the foreground and background of the three-dimensional object from a specific viewpoint. The camera path image generating unit 8 obtains information on the viewpoint position and the visual field used for generating the foreground/background image from the camera path image generation parameter. In the present embodiment, it is assumed that the camera path images to be list-displayed are all images obtained by looking down from the same viewpoint position and visual field. Besides, in the present embodiment, the foreground/background image generated in S103 is commonly used for all the list-displayed camera path images. When the viewpoint position or visual field from which the camera path is looked down is changed, it is determined in S102 that the camera path image generation parameter is updated, so that the foreground/background image is again generated in S103.

Next, in S104, the camera path list generating unit 6 sets a first camera path among the camera paths of the camera path images to be list-displayed, as a focused camera path.

Next, in S105, with respect to the target camera path, the camera path list generating unit 6 determines whether or not the camera path image generated by the current camera path image generation parameter is stored in the camera path image storing unit 7. When it is determined that the camera path image is not stored, the camera path list generating unit 6 advances the process to S106. On the other hand, when it is determined that the camera path image is stored, the camera path list generating unit advances the process to S108.

In S106, the camera path list generating unit 6 causes the camera path image generating unit 8 to generate the camera path image. The camera path image generating unit 8 in S106 reads the camera path data from the camera path storing unit 5, superposes the trajectory of the camera path on the foreground/background image generated in S103, and generates the obtained image as the camera path image. Here, the information of the position and visual field of the viewpoint looking down on the camera path, display/non-display of a line to be superposed, color and line, display interval and the like are obtained from the camera path image generation parameter read from the camera path image generation parameter storing unit 9 or are generated.

Incidentally, since the camera path image data once generated is stored in association with the camera path and the camera path image generation parameter, the camera path image generating process is skipped at the time of next display, and the stored camera path image data is reused.

In step S107, the camera path image generating unit 8 stores the camera path image generated in step S106 in the camera path image storing unit 7.

In step S108, the camera path list generating unit 6 reads the camera path image stored in the camera path image storing unit 7.

Then, in S109, the camera path list generating unit 6 lays out the camera path image read from the camera path image storing unit 7 within the window on the screen of the displaying unit 11, and list-displays the laid-out camera path images.

Thereafter, in S110, the camera path list generating unit 6 determines whether or not the focused camera path is the last camera path among the camera paths being the targets of list display. When it is determined in S110 that the focused camera path is the last camera path, the camera path list generating unit 6 returns the process to S101 and determines whether or not the camera path list is updated. On the other hand, when it is determined in S110 that the focused camera path is not the last camera path, the camera path list generating unit 6 advances the process to S111.

In S111, the camera path list generating unit 6 sets, among the camera paths selected as the targets of list display in S101, a next camera path of the current focused camera path to be a focused camera path, and returns the process to S105 to repeat the processes from S105.

By performing the process of FIG. 2 described above, in the camera path displaying system of the present embodiment, when the list of the camera paths being the targets of list display is updated or when the camera path image generation parameter is updated, a new camera path image list is displayed.

Figure 3A:
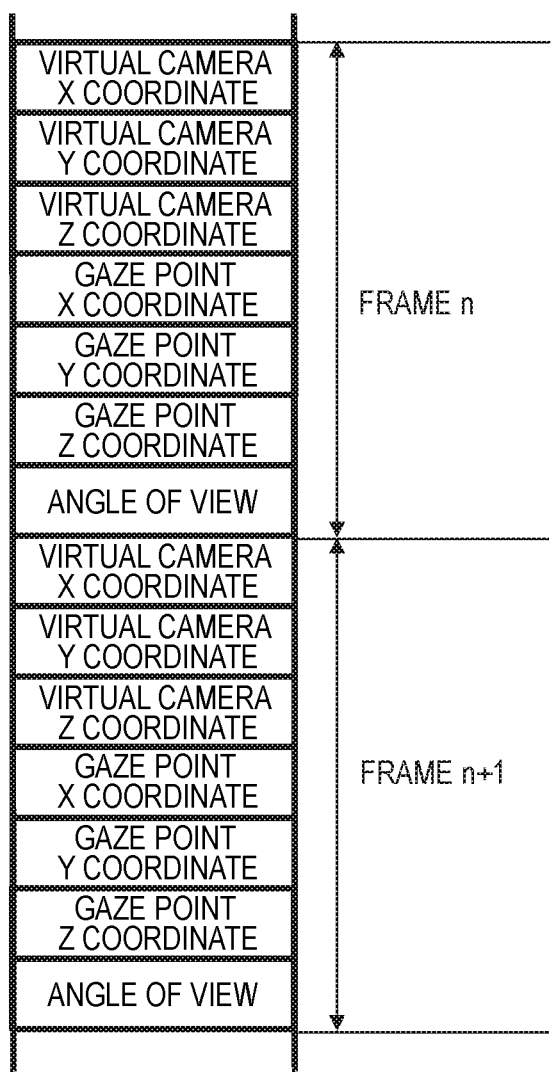
FIGS. 3A and 3B are diagrams for describing data formats of camera paths.
Figure 3B:
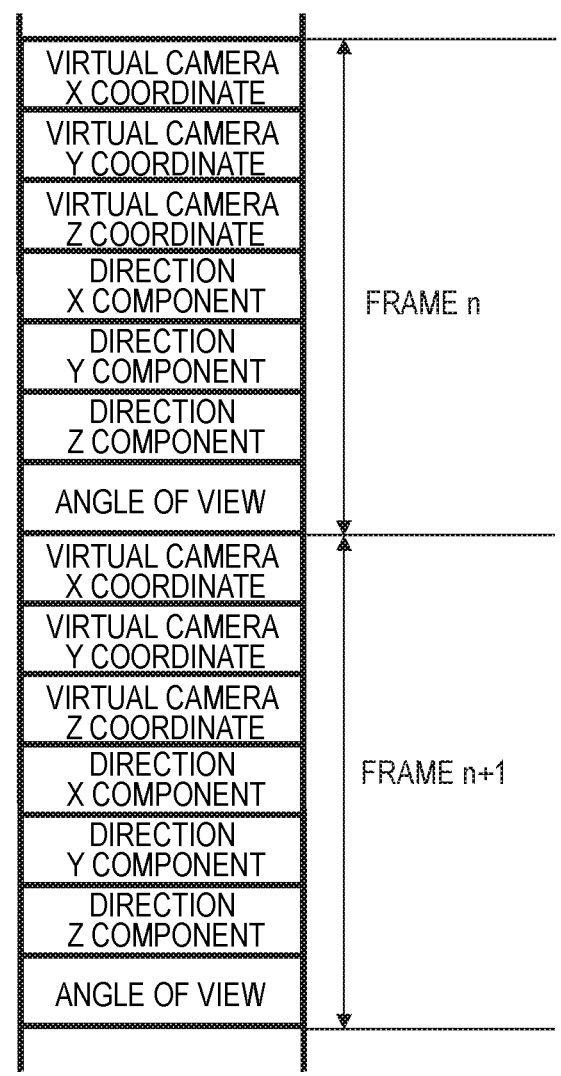

FIGS. 3A and 3B are diagrams for describing data formats of the camera paths.

FIG. 3A is a data example in case of designating the three-dimensional coordinates of the virtual camera and the three-dimensional coordinates and angle of view of a virtual camera gaze point for each frame of the moving image scene when generating the camera path. Here, the virtual camera gaze point is a point which is used to determine a direction that the virtual camera faces. The three-dimensional coordinates of the virtual camera and the three-dimensional coordinates of the virtual camera gaze point can be controlled independently of each other. For example, even if either one or both of the position of the virtual camera and the virtual camera gaze point move, it is controlled such that the virtual camera always faces the virtual camera gaze point. Besides, as the angle of view of the virtual camera, a horizontal angle of view and a vertical angle of view are designated with angles (degrees or radians) respectively. Alternatively, an aspect ratio (horizontal and vertical ratio) of a virtual camera video image and any value of the horizontal angle of view, the vertical angle of view and a diagonal angle of view are designated. Alternatively, the angle of view may be designated as a focal length (mm) in terms of 35 mm film as in case of representing an angle of view of a general camera lens.

FIG. 3B is another data example in case of designating the three-dimensional coordinates of the virtual camera, a three-dimensional direction in which the virtual camera faces and the angle of view for each frame of the moving image scene when creating the camera path. In a case where a controller of the operation unit 1 operating the virtual camera does not have a function of manipulating the position of the virtual camera gaze point, the data format of FIG. 3B is used. As for the length of a vector representing the three-dimensional direction, some information may be defined, but if nothing is defined, the relevant length is assumed to be a unit vector (vector of length 1).

Figure 4A:
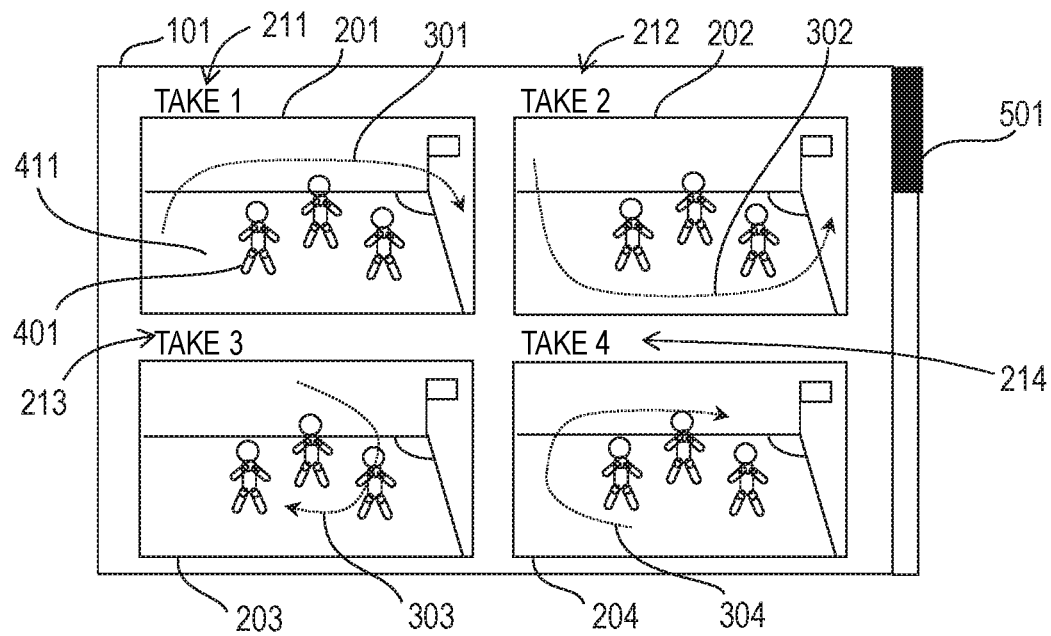
FIGS. 4A and 4B are diagrams for describing a first screen example of camera path list display.
Figure 4B:
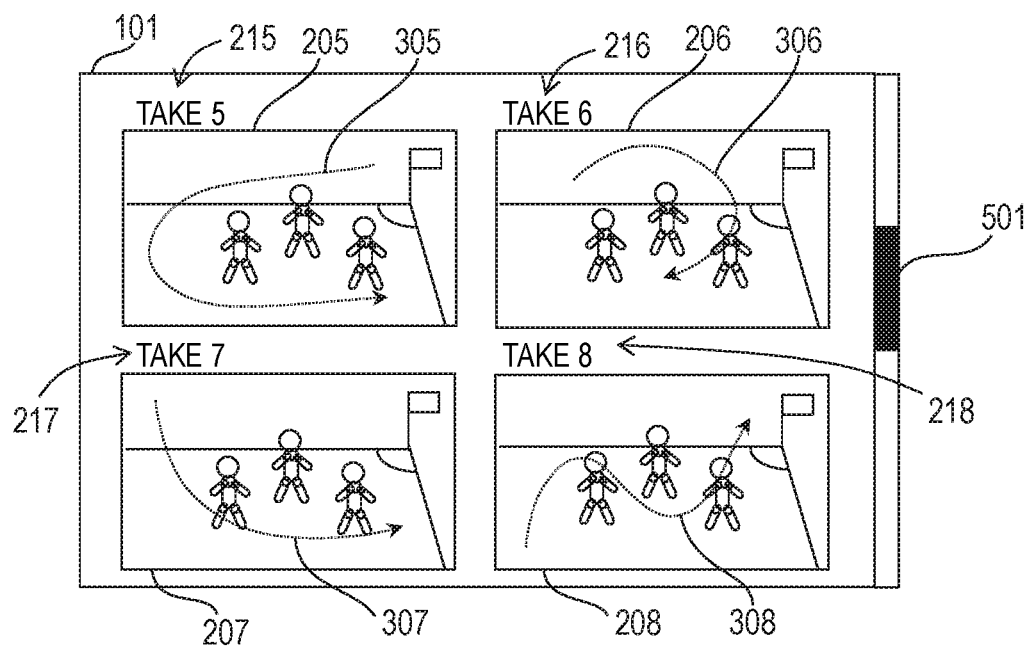

FIGS. 4A and 4B are diagrams for describing a first screen example of camera path list display generated by the camera path list generating unit 6 and displayed on the displaying unit 11. As exemplarily illustrated in FIG. 4A, the camera path list generating unit 6 generates the camera path list display (virtual camera path images) representing a plurality of movement paths including a first movement path (301 in FIG. 4A) and a second movement path (302 in FIG. 4A) of the virtual viewpoint. Incidentally, the camera path list generating unit 6 generates the camera path list display including a plurality of camera path images generated by using the camera path data (virtual camera path information).

In FIG. 4A, four camera path images 201, 202, 203 and 204 are list-displayed in a window 101. The display size of each camera path image is set by the camera path image generation parameter. Besides, in the vicinity of the camera path images 201, 202, 203 and 204, file names 211, 212, 213 and 214 of the camera paths of these camera path images are associated and displayed respectively.

In each of the camera path images 201, 202, 203 and 204, a foreground 401 and a background 411 respectively based on the three-dimensional object data are displayed. The three-dimensional objects of the foreground 401 and the background 411 are generated by, for example, separating via an image process the foreground (players, ball, etc.) and the background (field, spectators' seats, etc.) from the video images obtained by shooting a sports game with a large number of cameras (actual cameras instead of virtual cameras). Incidentally, all or a part of the three-dimensional objects may be generated by computer graphics. Display/non-display of the foreground and background is set by the camera path image generation parameter. The foreground and background may change depending on the progress of a scene, but in the present embodiment the foreground and background of a specific frame are used as representatives.

The specific frame is set based on the camera path image generation parameter. As the specific frame, for example, a start frame or an end frame of the moving image scene may be used, or an arbitrary frame in the middle may be used. The camera path image includes at least one of a state of the virtual camera in the specific frame, and the foreground and background of the three-dimensional space.

Besides, a plurality of frames may be designated as the specific frames. In a case where the plurality of frames are designated as the specific frames, the camera path image generating unit 8 may generate the camera path image by multiplexing the foregrounds of the designated plurality of frames. At that time, for example, it may be possible to cause the user to easily understand the passage of time by gradually changing opacity of the foreground (for example, increasing the opacity) from the start to the end of the moving image scene. Alternatively, it may be possible to rank the plurality of frames according to degrees of importance and increase opacity of the foreground of the high-ranking frame to achieve clear display. For example, in a soccer goal scene, when the foreground image at the moment of making a goal is displayed most clearly, it may be possible to cause the user to easily understand that the viewpoint at the relevant moment is particularly important.

In the camera path image generating unit 8, the foreground 401 and the background 411 are rendered as two-dimensional images which are obtained by looking down on the three-dimensional space from a specific viewpoint. The looking-down viewpoint position and the range of the visual field are set by the camera path image generation parameters. As the looking-down viewpoint, for example, it may be possible to set a viewpoint for looking down on the center point of a stadium from directly above may be set. Alternatively, as illustrated in FIG. 4A, it may be possible to set a viewpoint for looking down an important point in the relevant scene diagonally from above.

Figure 5:
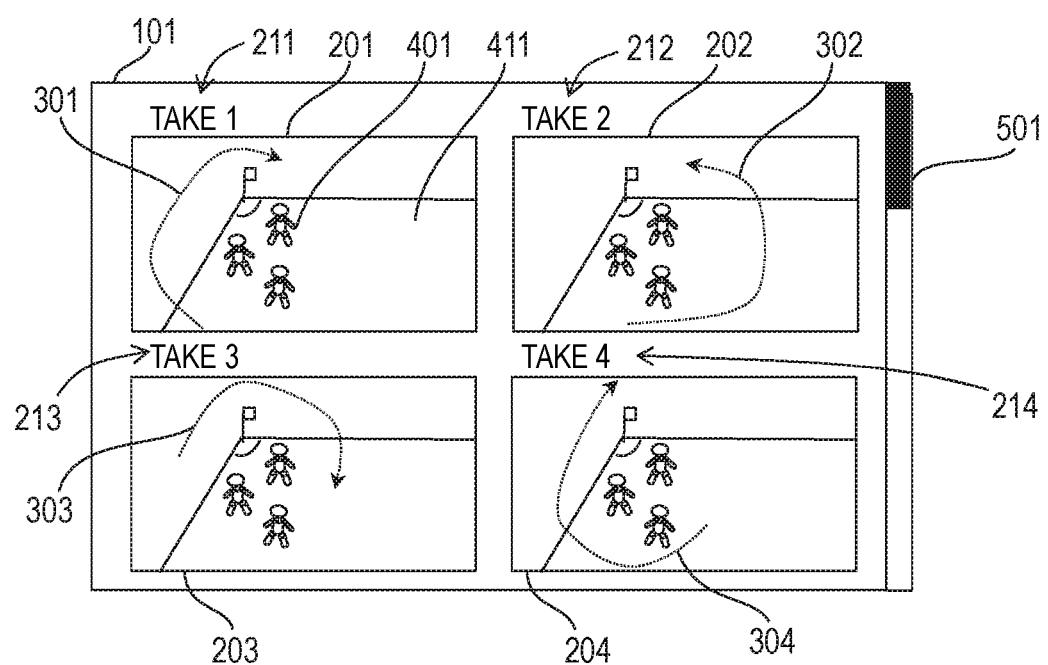
FIG. 5 is a diagram for describing a modified example of the first screen example of the camera path list display.

FIG. 5 is a diagram for describing a screen example of the four camera path images 201 to 204 which are list-displayed by the camera path list generating unit 6 after an operation of simultaneously changing the looking-down viewpoint positions for the four camera path images 201 to 204 of FIG. 4A was performed and thus these images were updated. Display/non-display of the foreground 401 and the background 411 in FIG. 5 is set by the camera path image generation parameter.

As illustrated in FIGS. 4A and 5, figures (hereinafter referred to as trajectories 301, 302, 303 and 304) representing movement paths of the virtual camera are displayed respectively with respect to the camera path images 201, 202, 203 and 204 respectively. In the trajectory display, it is possible to plot marks at specific frame intervals and represent movement speed of the virtual cameras by sparseness and density of the plotted marks. Besides, in the case where the foregrounds of the specific plurality of frames are multiplexed and displayed as described above, it may be possible to plot marks on the positions of the virtual cameras in the plurality of frames. Besides, in the case where the opacity of the foregrounds in the above specific plurality of frames is changed and displayed, it may be possible to display the marks to be plotted by changing their opacity in conformity with the opacity of the foregrounds.

Display/non-display of a line, color and shape of the line, display interval of marks, and the like as figures representing the trajectory are set by the camera path image generation parameters. Incidentally, in the trajectory display, since the three-dimensional trajectory is projected on a two-dimensional plane, it may be difficult to understand a height or a perspective. In the case where it is difficult to understand the height or the perspective, an auxiliary line may be displayed as a figure representing the trajectory as appropriate. As the auxiliary line, for example, a perpendicular line may be drawn from a point on the trajectory toward the ground (virtual ground). Alternatively, the trajectory of the intersection between the perpendicular line and the ground may be displayed as the auxiliary line. Drawing the auxiliary line like this makes it easier to understand the height and the perspective. Display/non-display of or not the auxiliary line, color and shape of the auxiliary line, and display interval of the auxiliary line are set by the camera path image generation parameter.

Besides, as illustrated in FIGS. 4A and 5, a scroll bar 501 to be slide-operated in response to an operation of the operation unit 1 is displayed on the screen. When the scroll bar 501 is slide-operated, for example, in the downward direction by the operation of the operation unit 1, the camera path list generating unit 6 causes the window 101 to be scroll-displayed, so that further four camera path images 205, 206, 207 and 208 are list-displayed as illustrated in FIG. 4B.

Also in the example of FIG. 4B, as well as FIG. 4A, the display size of the four camera path images 205 to 208 is set by the camera path image generation parameter. Besides, in the vicinity of the camera path images 205, 206, 207 and 208, file names 215, 216, 217 and 218 of the camera paths of these camera path images are associated and displayed respectively. Similarly to the above, the foreground and background based on the three-dimensional object data and figures (trajectories 305, 306, 307 and 308) representing movement paths of the virtual camera are displayed respectively in the camera path images 205 to 208. Similarly to the above, also in the example of FIG. 4B, the scroll bar 501 to be slide-operated in response to the operation of the operation unit 1 is displayed on the screen, and scroll display of the window 101 is performed according to the slide operation.

Figure 6:
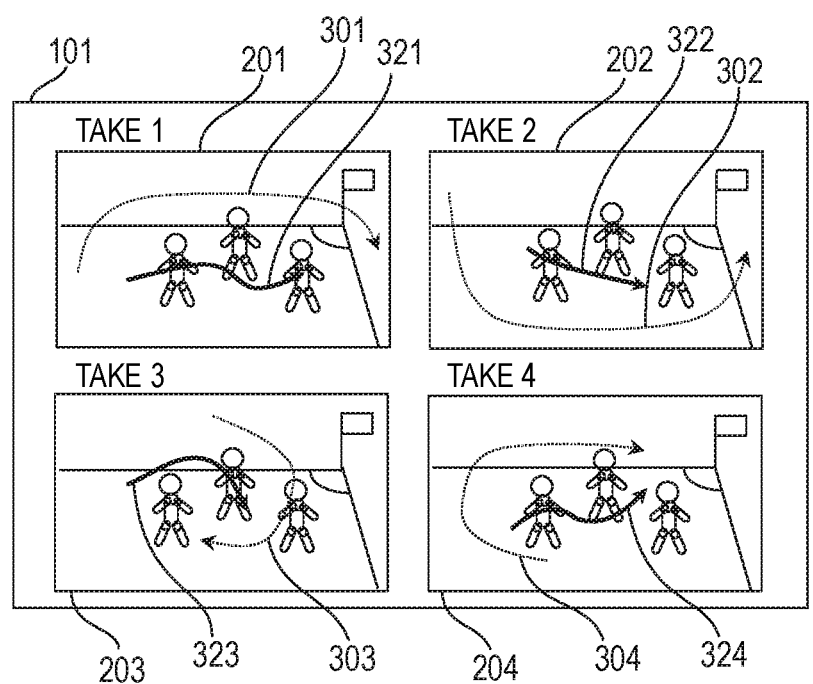
FIG. 6 is a diagram for describing a second screen example of the camera path list display.

FIG. 6 is a diagram for describing a second screen example of the camera path list display generated by the camera path list generating unit 6 and displayed on the displaying unit 11.

In the second screen example, the camera path list generating unit 6 causes the camera path image generating unit 8 to generate the camera path images which are obtained by adding figures (trajectories 321, 322, 323 and 324) representing the movement paths of the virtual camera gaze points to the respective display contents of the first screen example of FIG. 4A. The display of the screen example of FIG. 6 can be performed in a case where the data format of the camera path includes the three-dimensional coordinates of the virtual camera gaze point (see FIG. 3A). Also in case of displaying the trajectories 321 to 324 of the virtual camera gaze point positions, as well as the above example of the movement path of the virtual camera, it is possible to plot marks at specific frame intervals and represent movement speed of the virtual cameras by sparseness and density of the plotted marks. Display/non-display of a line being the figure representing the movement path of the virtual camera gaze point, color and shape of the line, display interval of the marks, and the like are set by the camera path image generation parameters.

Figure 7A:
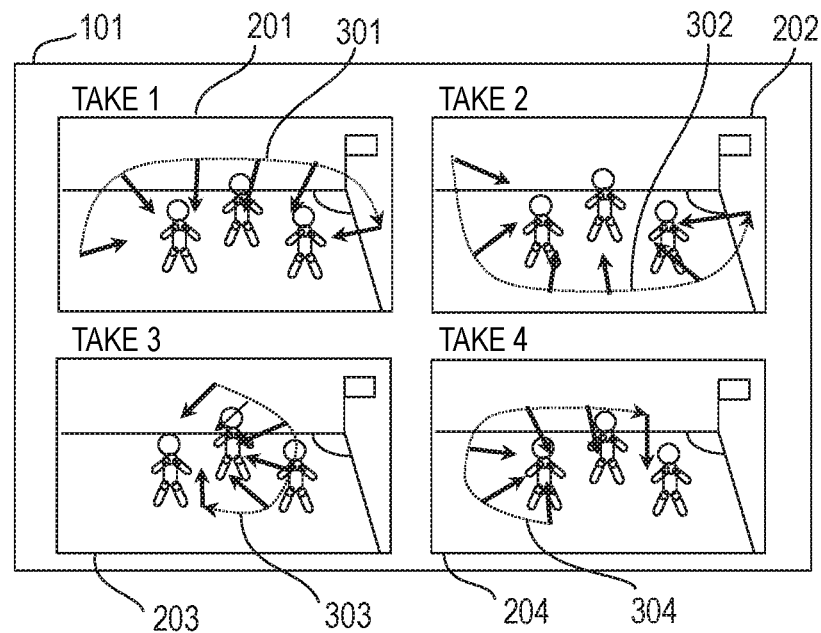
FIGS. 7A and 7B are diagrams for describing a third screen example of the camera path list display.
Figure 7B:
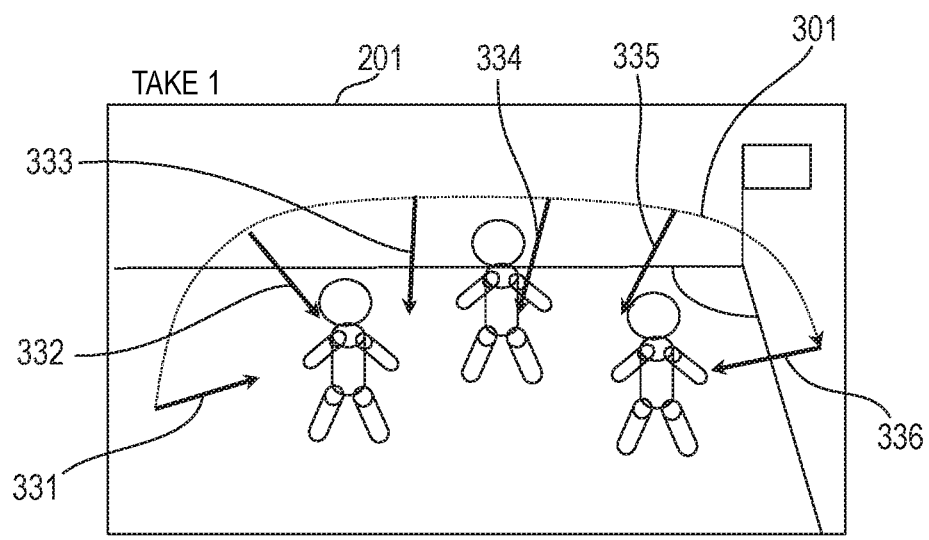

FIGS. 7A and 7B are diagrams for describing a third screen example of the camera path list display generated by the camera path list generating unit 6 and displayed on the displaying unit 11. FIG. 7B is the diagram obtained by enlarging a part (e.g., the camera path image 201) of FIG. 7A.

In the third screen example, the camera path list generating unit 6 causes the camera path image generating unit 8 to generate the camera path images which are obtained by adding figures (arrow lines 331, 332, 333, 334, 335 and 336) representing three-dimensional directions to which the virtual cameras face to the respective display contents of the first screen example of FIG. 4A. The display of the arrow lines 331 to 336 representing the three-dimensional directions to which the virtual cameras face can be performed also in a case where the data format of the camera path does not include the three-dimensional coordinates of the virtual camera gaze point (see FIG. 3B). Display/non-display of the arrow line being the figure representing the three-dimensional direction to which the virtual camera faces, color and shape of the arrow line, display interval of the arrow lines are set by the camera path image generation parameter.

Figure 8:
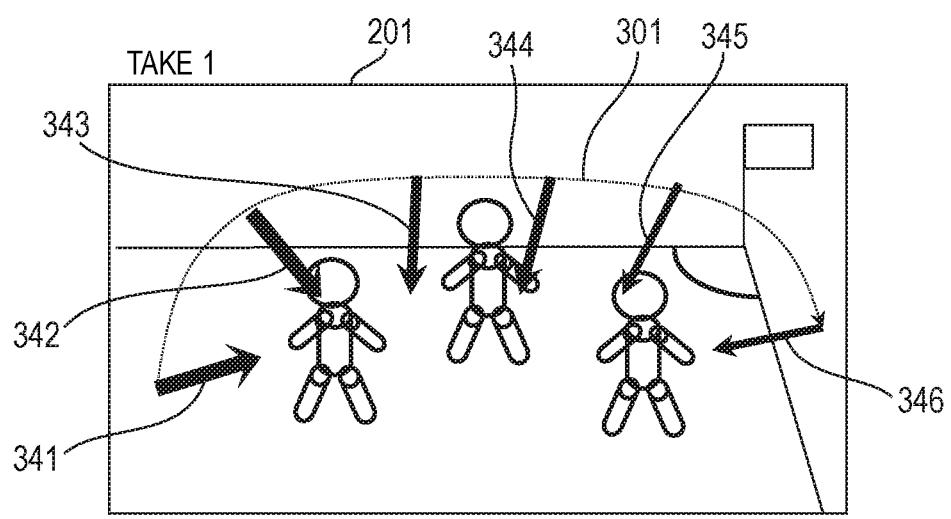
FIG. 8 is a diagram for describing a fourth screen example of the camera path list display.

FIG. 8 is a diagram for describing a fourth screen example of the camera path list display generated by the camera path list generating unit 6 and displayed on the displaying unit 11. FIG. 8 is the diagram obtained by enlarging a part (e.g., the camera path image 201) of the camera path list display similar to that in FIG. 7A.

The fourth screen example of FIG. 8 is a display example in which the thicknesses of arrow lines 341, 342, 343, 344, 345 and 346 representing the three-dimensional directions to which the virtual cameras face are changed with respect to the screen example of FIG. 7B. In the fourth screen example, the line thickness of each of the arrow lines 341 to 346 represents the angle of view of the virtual camera, and the thicker the arrow line, the wider the angle of view. Incidentally, as a modified example of FIG. 8, the angle of view of the virtual camera may be represented by the color density of the arrow line, the size of the tip of the arrow, and the like. Association between the thickness of the arrow line (or the color density of the arrow line, the size of the tip of the arrow) and the angle of view of the virtual camera is set by the camera path image generation parameter.

Figure 9:
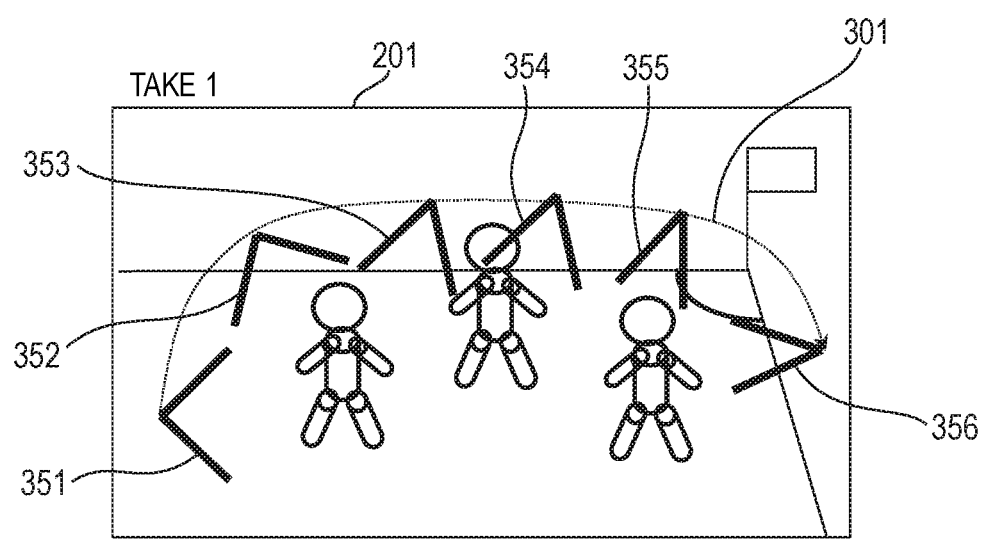
FIG. 9 is a diagram for describing a modified example of the fourth screen example of the camera path list display.

FIG. 9 is a diagram for describing a further modified example of FIG. 8, and is a screen example in which each of angles of view 351, 352, 353, 354, 355 and 356 of the virtual camera is represented by an opening angle of two lines. Also in the screen example of FIG. 9, association between the opening angle of the two lines and the angle of view of the virtual camera is set by the camera path image generation parameter.

Figure 10:
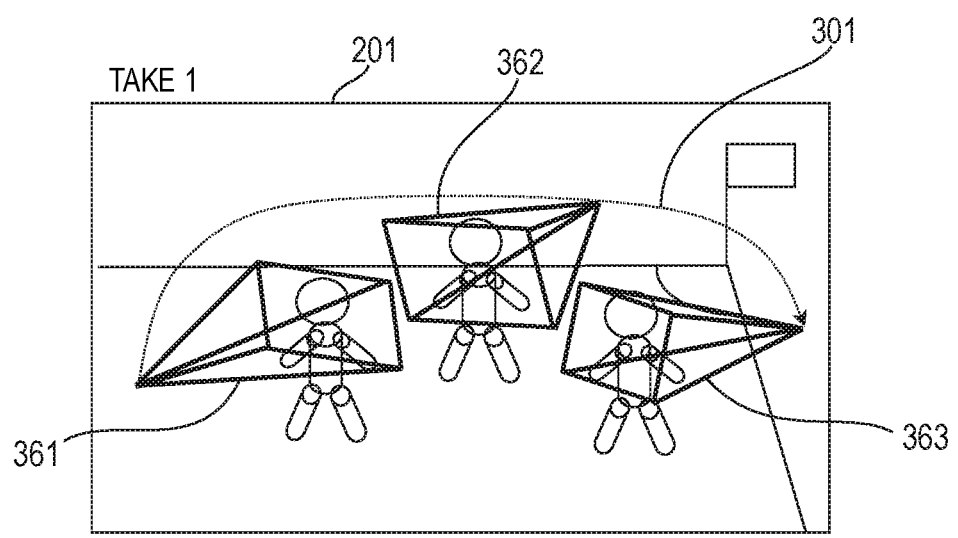
FIG. 10 is a diagram for describing another modified example of the fourth screen example of the camera path list display.

FIG. 10 is a diagram for describing a further modified example of FIG. 8, and is a screen example in which horizontal angles of view and vertical angles of view are represented by quadrangular pyramids 361, 362 and 363. The center of the bottom side of each of the quadrangular pyramids 361, 362 and 363 represents the virtual camera gaze point. Display of the screen example of FIG. 10 can be performed in the case where the data format of the camera path includes the three-dimensional coordinates of the virtual camera gaze point (see FIG. 3A).

Incidentally, in the screen examples of FIGS. 9 and 10, the angle of view can be more intuitively represented as compared with the screen example of FIG. 8. However, since the number of lines for representing the angle of view increases, there is a possibility that the display becomes complicated.

Since switching of displaying method of the angle of view is set by the camera path image generation parameter, the user can appropriately switch to an eye-friendly displaying method by the operation via the operation unit 1. In this case, the camera path list generating unit 6 switches the display in accordance with the operation via the operation unit 1.

In the above screen example, the foreground/background image is generated from the three-dimensional object, and the figure representing the trajectory of the camera path is superposed on the foreground/background image. As another example, it may be possible to generate the camera path image by superposing a figure representing the trajectory of the camera path on a video image of an actual camera (preferably looking down on the entire range where a subject is present). In this case, there are restrictions on the viewpoint position and visual field looking down on the camera path. However, the three-dimensional object storing unit 2 becomes unnecessary and the image process of generating the foreground/background image from the three-dimensional object becomes unnecessary in the camera path image generating unit 8, so that the system can be simplified. When the camera path image is selected and the free viewpoint video image is displayed on the camera path list display screen, it only has to previously store the free viewpoint video image generated by the camera path as the moving image file and play back the stored video image.

When there are the plurality of above actual cameras and the respective looking-down viewpoint positions and visual fields are different in these cameras, it may be possible to generate the camera path image by using the camera designated by the camera path image generation parameter. Besides, for example, in the generation of the camera path image of sports broadcasting, it may be possible to display the positions and motions of players, balls and the like with graphics (lines, figures, numbers, etc.) by obtaining tracking data.

As described above, according to the first embodiment, by list-displaying the images (camera path images) obtained by looking down on the trajectories of the camera paths, it is possible for the user to quickly find the desired camera path from among the large number of camera paths. In particular, in a case where there are a large number of similar camera paths, by firstly looking at the camera path images to narrow down the candidates and further changing the viewpoint position and visual field for looking down on the camera path, the user can easily distinguish the similar camera paths. Furthermore, if it is still difficult to distinguish the similar camera paths, the user may select the candidate camera path image and actually play back the free viewpoint video image. As just described, according to the first embodiment, the user can efficiently find the desired camera path by looking at the camera path images to narrow down the candidates and then playing back the free viewpoint video images, rather than by playing back the free viewpoint video image for the large number of camera paths each time.

Besides, in the present embodiment, when the operation to change the camera path image generation parameter is performed, the change is applied all at once to all the camera path images being the list targets. Therefore, the user can easily perform the work of finding the desired camera path by comparing the plurality of camera paths under the same condition.

Second Embodiment

Hereinafter, an example in which the camera path image generation parameter can be set for each camera path will be described as the second embodiment. Since the configuration of the camera path displaying system of the second embodiment is the same as that of FIG. 1, illustration and explanation thereof will be omitted. In a case where one or more camera path images are selected and the camera path image generation parameter is set by a menu (not illustrated) operation, the camera path list generating unit 6 of the second embodiment changes only the camera path image generation parameter corresponding to the selected camera path.

Figure 11:
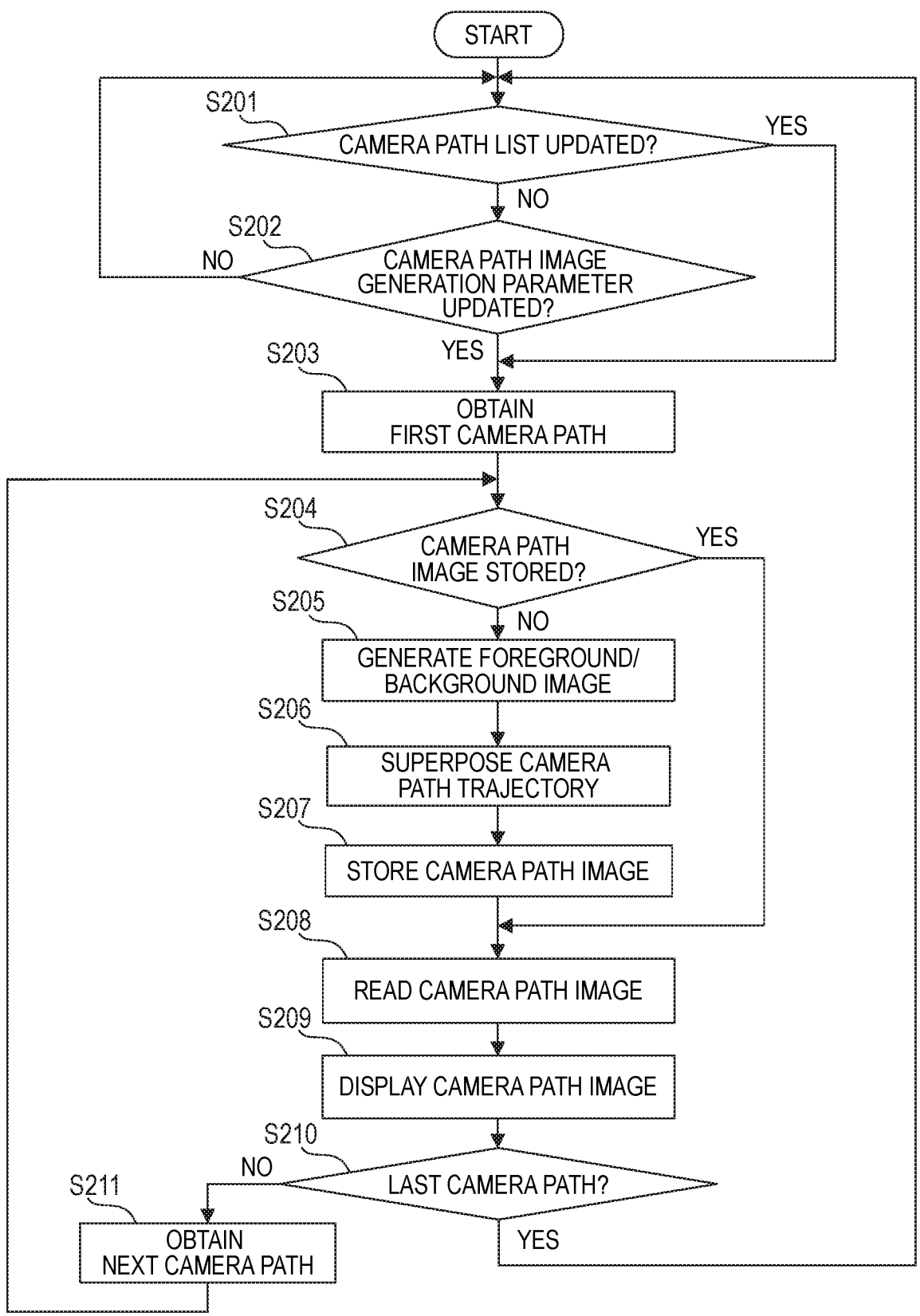
FIG. 11 is a flowchart of the camera path list displaying process according to a second embodiment.

FIG. 11 is a flowchart for describing a flow of the process of list-displaying the camera path images in the second embodiment.

In FIG. 11, processes in S201 and S202 are respectively the same as those in S101 and S102 of FIG. 2, a process in S203 is the same as that in S104, a process in S204 is the same as that in S105, and processes in S206 to S211 are respectively the same as those in S106 to S111.

In the flowchart of FIG. 11, when it is determined in S201 that the camera path list is updated, or when it is determined in S202 that the camera path image generation parameter is updated, the process is advanced to S203. Besides, when it is determined in S204 that the camera path image is not stored, the process is advanced to S205.

In S205, the foreground/background image generating process is performed for each camera path by the camera path image generating unit 8, and thereafter the process is advanced to S206. When superposing the camera path trajectory in S206, display/non-display of the trajectory, color and shape of the line, display interval and the like are determined based on the camera path image generation parameter for each camera path.

That is, in the flowchart of FIG. 2 of the first embodiment, the camera path list generating unit 6 causes the camera path image generating unit 8 to perform the foreground/background image generating process of S103 in common for all the camera paths. On the other hand, in the flowchart of FIG. 11 of the second embodiment, the camera path list generating unit 6 causes the camera path image generating unit 8 to perform the foreground/background image generating process for each camera path in S205. Besides, in S206, the camera path list generating unit 6 causes the camera path image generating unit 8 to superpose a figure representing the trajectory on the foreground/background image based on the camera path image generation parameter for each camera path.

In the above flowchart of FIG. 2, it is aimed to avoid duplication of the same process by previously creating the common camera path image in S103. Also in the flowchart of FIG. 11, when generating the foreground/background image in S205, it is determined whether or not the camera path images based on the same camera path image generation parameter are stored. Then, when the camera path images based on the same camera path image generation parameter are stored, it is possible to avoid duplication of the same process.

Figure 12:
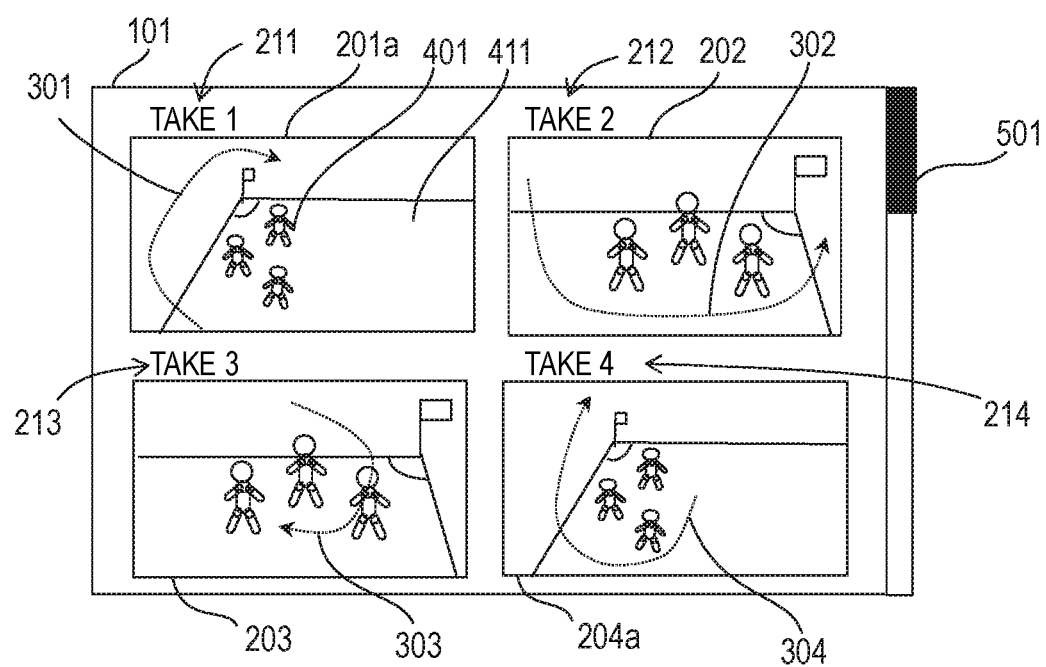
FIG. 12 is a diagram for describing a screen example of the camera path list display according to the second embodiment.

FIG. 12 is a diagram for describing an updated screen example which is obtained after an operation of changing the looking-down viewpoint positions was performed for the camera path image 201 and the camera path image 204 of the screen example illustrated in FIG. 4A. A camera path image 201a of FIG. 12 is an image obtained after the operation of changing the looking-down viewpoint position for the camera path image 201 of FIG. 4A was performed. A camera path image 204a of FIG. 12 is an image obtained after the operation of changing the looking-down viewpoint position for the camera path image 204 of FIG. 4A was performed. When the looking-down viewpoint positions are changed, as shown by the camera path images 201a and 204a of FIG. 12, not only the foreground 401 and the background 411 but also the trajectories 301 and 304 of the virtual camera positions are changed according to the updated looking-down viewpoint positions.

Besides, in the second embodiment, in the case where the camera path image which well represents the feature of the camera path is generated based on the setting of the image generation parameter, it may be possible to store the relevant camera path image as the default camera path image of the camera path. Thus, when the camera path list is displayed for the first time, it is possible to display the camera path image which well represents the feature of the camera path, so that the user can easily narrow down the camera paths when looking at the camera path image list.

For example, in the same scene of sports, a camera path group which pays attention to a player A uses as a default the camera path image obtained by looking down around the player A, and a camera path group which pays attention to a player B uses as a default the camera path image obtained by looking down around the player B. Thus, when the user looks at the camera path image list of the relevant scene, he/she can easily narrow down to the camera path focusing on, e.g., the player A.

Besides, for example, in the same scene of sports, a default looking-down direction may be changed between a camera path group paying attention to an attacking-side team and a camera path group paying attention to a defending-side team. Thus, when the user looks at the camera path image list of the relevant scene, he/she can easily narrow down to the camera path which pays attention to one of these teams.

As described above, in the second embodiment, by enabling to set the camera path image generation parameter for each camera path, the user can easily grasp the feature for each camera path when he/she looks at the camera path image list display.

As described above, according to the first and second embodiments, the display and updating of the image obtained by looking down on the trajectory of the camera path are performed, so that the user can quickly confirm the content of each camera path. Therefore, the user can quickly find the desired camera path from among the large number of camera paths. In the above embodiment, as illustrated in FIGS. 4A to 7B, the example that the plurality of camera path images are displayed side by side has been mainly described, but the present invention is not limited to this example. For example, it is also possible to adopt a mode in which two or more camera path images are superposed and displayed in one video image.

Although the present invention has been described as above in conjunction with the above embodiments, these embodiments are merely the examples of concretization for carrying out the present invention. Accordingly, the technical scope of the present invention should not be interpreted restrictively or limitedly by the above embodiments. Namely, the present invention can be carried out in various forms without departing from the technical idea or the main feature of the present invention.

According to the above information processing apparatus 20, it is possible to quickly find the desired camera path from among the plurality of camera paths.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-223686, filed Nov. 21, 2017, which is hereby incorporated by reference herein in its entirety.

What is claimed is:

1. A display controlling apparatus comprising:
one or more hardware processors; and
one or more memories which store instructions executable by the one or more hardware processors to cause the display controlling apparatus to perform at least:
(1) obtaining viewpoint path information for specifying a movement path of a virtual viewpoint corresponding to a virtual viewpoint image that is generated based on a plurality of captured images of an area captured with a plurality of image capturing apparatuses;
(2) generating, based on the obtained viewpoint path information, a path representation image for representing concurrently a plurality of movement paths of the virtual viewpoint; and
(3) causing a display screen to display the generated path representation image,
wherein in the generated path representation image, a figure representing a movement path of the virtual viewpoint is superimposed on an image of the area viewed from a specific viewpoint that is not on a movement path of the virtual viewpoint.

2. The display controlling apparatus according to claim 1, wherein the instructions further cause the display controlling apparatus to perform:
setting a parameter for generating the path representation image based on user input,
wherein the path representation image is generated based on the obtained viewpoint path information and the set parameter.

3. The display controlling apparatus according to claim 1, wherein the path representation image includes a figure representing a time-dependent change of at least any of a position of the virtual viewpoint, a direction of the virtual viewpoint, an angle of view of the virtual viewpoint, and a gaze point corresponding to the virtual viewpoint.

4. The display controlling apparatus according to claim 1, wherein the instructions further cause the display controlling apparatus to perform obtaining data related to a three-dimensional object in the area, and
wherein in the generating, the path representation image including an image of the three-dimensional object in the area is generated based on the obtained data.

5. The display controlling apparatus according to claim 1, wherein the path representation image includes a figure representing at least any of height and perspective of the movement path of the virtual viewpoint.

6. The display controlling apparatus according to claim 2, wherein the set parameter for generating the path representation image includes a parameter representing a position of a viewpoint for looking on a movement path of the virtual viewpoint.

7. The display controlling apparatus according to claim 2, wherein the set parameter includes information for designating at least any of display/non-display, shape, color, display interval, and opacity of a figure or an image displayed in the path representation image.

8. The display controlling apparatus according to claim 2, wherein the parameter includes information for designating a point of time in a capturing period of the plurality of image capturing apparatuses.

9. The display controlling apparatus according to claim 8, wherein the generated path representation image represents both an object in the area at the designated point of time and the plurality of movement paths of the virtual viewpoint in a period including time around the designated point of time.

10. The display controlling apparatus according to claim 9, wherein the path representation image is generated by superimposing images of objects at a plurality of designated points of time.

11. The display controlling apparatus according to claim 10, wherein in the generated path representation image, the opacity of the objects is gradually changed depending on the point of time corresponding to each object.

12. The display controlling apparatus according to claim 10, wherein in the generated path representation image, the opacity of an object is determined based on a degree of importance of the point of time corresponding to the object.

13. The display controlling apparatus according to claim 1, wherein, in a case where at least one movement path among the plurality of movement paths is updated, the path representation image is updated.

14. The display controlling apparatus according to claim 2, wherein the path representation image includes a plurality of path images respectively representing the plurality of movement paths of the virtual viewpoint, and
wherein in a case where the parameter is updated by user input, the updated parameter is applied to all of the plurality of path images.

15. The display controlling apparatus according to claim 2, wherein the path representation image includes a plurality of path images respectively representing the plurality of movement paths of the virtual viewpoint, and
wherein in a case where the parameter is updated by user input, the updated parameter is applied to each of one or more path images selected from among the plurality of path images.

16. A display controlling method comprising:
obtaining viewpoint path information for specifying a movement path of a virtual viewpoint corresponding to a virtual viewpoint image that is generated based on a plurality of captured images of an area captured with a plurality of image capturing apparatuses;
generating, based on the obtained viewpoint path information, a path representation image for representing concurrently a plurality of movement paths of the virtual viewpoint; and
causing a display screen to display the generated path representation image, wherein in the generated path representation image, a figure representing a movement path of the virtual viewpoint is superimposed on an image of the area viewed from a specific viewpoint that is not on a movement path of the virtual viewpoint.

17. The display controlling method according to claim 16, further comprising setting a parameter for generating the path representation image based on user input, wherein the path representation image is generated based on the obtained viewpoint path information and the set parameter.

18. A non-transitory computer-readable storage medium which stores a program for causing a computer to perform a display controlling method comprising:

obtaining viewpoint path information for specifying a movement path of a virtual viewpoint corresponding to a virtual viewpoint image that is generated based on a plurality of captured images of an area captured with a plurality of image capturing apparatuses;

generating, based on the obtained viewpoint path information, a path representation image for representing concurrently a plurality of movement paths of the virtual viewpoint; and causing a display screen to display the generated path representation image, wherein in the generated path representation image, a figure representing a movement path of the virtual viewpoint is superimposed on an image of the area viewed from a specific viewpoint that is not on a movement path of the virtual viewpoint.

19. The storage medium according to claim 18, wherein the display controlling method further comprises setting a parameter for generating the path representation image based on user input, and wherein the path representation image is generated based on the obtained viewpoint path information and the set parameter.

20. The display controlling apparatus according to claim 1, wherein the image of the area is obtained by an image capturing apparatus positioned at the specific viewpoint.

21. The display controlling apparatus according to claim 1, wherein the image of the area is generated based on user input designating the specific viewpoint and the plurality of images of the area captured with the plurality of image capturing apparatuses.

22. The display controlling apparatus according to claim 1, wherein the instructions further cause the display controlling apparatus to perform:

receiving user input for selecting a movement path among the plurality of movement paths of the virtual viewpoint; and causing the display screen to display a virtual viewpoint image corresponding to the selected movement path of the virtual viewpoint.

23. The display controlling apparatus according to claim 1, wherein the generated path representation image includes a plurality of path images each representing a movement path of the virtual viewpoint, and wherein in each of the plurality of path images, a figure representing a movement path of the virtual viewpoint is superimposed on an image of the area viewed from a specific viewpoint that is not on a movement path of the virtual viewpoint.

* * * * *